United States Patent
Leegate et al.

(10) Patent No.: US 9,630,727 B1
(45) Date of Patent: Apr. 25, 2017

(54) SYSTEM, METHOD, AND APPARATUS FOR MARKING A DROP ZONE AREA

(71) Applicant: ARCACHON HOLDINGS LLC, Clearwater, FL (US)

(72) Inventors: Gary Leegate, Clearwater, FL (US); Marcia Baldwin, Clearwater, FL (US)

(73) Assignee: Arcachon Holdings LLC, Clearwater, FL (US)

( * ) Notice: Subject to any disclaimer, the term of this patent is extended or adjusted under 35 U.S.C. 154(b) by 0 days.

(21) Appl. No.: 14/934,183

(22) Filed: Nov. 6, 2015

(51) Int. Cl.
| | |
|---|---|
| B64F 1/20 | (2006.01) |
| F21V 23/00 | (2015.01) |
| F21V 23/04 | (2006.01) |
| F21L 4/00 | (2006.01) |
| B64D 17/76 | (2006.01) |
| B64D 17/22 | (2006.01) |
| G08B 5/38 | (2006.01) |
| B64D 47/02 | (2006.01) |
| B64D 17/00 | (2006.01) |
| F21W 111/06 | (2006.01) |

(52) U.S. Cl.
CPC ............... *B64F 1/20* (2013.01); *B64D 17/00* (2013.01); *B64D 17/22* (2013.01); *B64D 17/76* (2013.01); *B64D 47/02* (2013.01); *F21L 4/00* (2013.01); *F21V 23/003* (2013.01); *F21V 23/0407* (2013.01); *F21V 23/0414* (2013.01); *G08B 5/38* (2013.01); *F21W 2111/06* (2013.01)

(58) Field of Classification Search
CPC ........... B64F 1/20; B64D 17/76; B64D 17/22; B64D 17/00; B64D 47/02; F21V 23/0414; F21V 23/003; F21V 23/0407; G08B 5/38; F21L 4/00; F21Y 2101/02; F21W 2111/06
See application file for complete search history.

(56) References Cited

U.S. PATENT DOCUMENTS

| | | |
|---|---|---|
| 2,045,521 A | 2/1935 | De Hertelendy |
| 3,164,801 A | 1/1965 | Nicholl |
| 3,869,913 A | 3/1975 | Niskin |
| 4,554,827 A | 11/1985 | Kirby-Smith |
| 7,695,334 B2 * | 4/2010 | Yonover .................. B63C 9/20 |
| | | 116/109 |

* cited by examiner

*Primary Examiner* — Stephen F Husar
(74) *Attorney, Agent, or Firm* — Larson & Larson, P.A.; Frank Liebenow; Patrick Reid

(57) ABSTRACT

A drop zone marker includes a parachute, a first light module connected to the parachute by a first length of cord and a second light module connected to the first light module by a second length of the cord. A ballast is connected to the second light module by a third length of the cord is provided for pulling downwardly the drop zone marker. The parachute is configured to include an integral packing/deployment bag within which all components of the drop zone marker are contained up until deployment.

20 Claims, 11 Drawing Sheets

100

SYSTEM, METHOD, AND APPARATUS FOR MARKING A DROP ZONE AREA

FIELD

This invention relates to the field of parachuting and more particularly to a system for marking a drop zone onto which parachutists intend to land.

BACKGROUND

Parachutists are routinely deployed during dark of night conditions for maximum security during covert tactical operations.

Aside from considerations such a terrain and vegetation at the intended parachute landing point or drop zone, wind direction and relative wind speed at the drop zone is of the highest concern in setting up a final approach for a successful, safe parachute landing during any operation, but particularly at night when there are likely no other visual cues to these conditions. Also important is the ability to mark the approximate location of the drop zone, itself.

Prior parachute-borne wind direction markers were designed to be deployed from aircraft or by parachutists but lacked the ability to (a) minimize wind drift through the descent phase—thereby having less accuracy of drop zone location marking, and (b) maximize the effect of wind drift after initial contact with the ground by minimizing the mass of all components above the ballast—thereby providing the maximum separation after the ballast lands at the drop zone target. The prior direction markers often failed to provide an indication of wind direction and/or wind speed.

What is needed is a easily deployed, light-weight system that will mark a location at which it is advantageous for the parachutists to target when landing in the dark, providing a clear indication of surface wind direction and relative wind speed at the drop zone location.

SUMMARY

The drop zone marker described here within includes its own parachute and associated cords, light modules, a ballast module, and an integral packing/deployment bag. The drop zone marker is packed, stored, and carried in an integral packing/deployment bag. Once deployed, the drop zone marker parachute opens up and the ballast module, having a greater mass density, leads the way to the ground at until the ballast module hits the ground, slowing the rate of decent of the parachute, which remains connected to the ballast module, thereby descending down-wind (away) from the ballast module. One of the light modules is located closer to the ballast module and one of the light modules is located closer to the parachute. In order to create visual differentiation necessary to mark wind direction, each light module emits a different type of light and/or emits light differently (e.g., flashing or steady operation). For example, the light module closest to the ballast module emits green flashing light while the light module closest to the parachute emits red steady light, or in the case of an infrared (IR) device, the light module closest to the ballast module emits a flashing IR light and the light module closest to the parachute emits a steady IR light. After landing, the two light modules will have a separation between them determined by wind conditions. The parachutist is able to see both light modules so as to target the drop zone from a high altitude, then as the parachutist nears the drop zone, the parachutist is able to judge the wind direction at the ground by the relative position of the light module located at the parachute with respect to the light module located at the ballast module. Further, the parachutist is able to judge relative wind speed based upon the separation distance between the two light modules. For example, if there is very little wind speed, the light modules will be very close to each other and if there is a high wind speed, the light modules will achieve maximum separation as determined by length of cord by which they are attached to each other.

In one embodiment, a drop zone marker is disclosed including a parachute, a first light module interfaced to the parachute, and a second light module connected to both the first light module and the parachute by a length of cord. A ballast is connected to the second light module and is provided for pulling downwardly the drop zone marker.

In another embodiment, a drop zone marker is disclosed including a parachute, a first light module connected to the parachute by a first length of cord and a second light module connected to the first light module by a second length of the cord. A ballast is connected to the second light module by a third length of the cord is provided for pulling downwardly the drop zone marker.

In another embodiment, a drop zone marker is disclosed including a parachute connected to a first light module by a first length of cord. The first light module has a first light emitting diode, a first power source, a first control circuit operatively coupled to the first light emitting diode and the first power source, and a first switch. The first switch is coupled to the first power source and to the first control circuit. In a first position of the first switch, the first light emitting diode is off; and in a second position of the first switch, the first light emitting diode is illuminated. A second light module is connected to the first light module by a second length of cord, a separation cord. The second light module has a second light emitting diode, a second power source, a second control circuit operatively coupled to the second light emitting diode and the second power source, and a second switch, the second switch operatively coupled to the second power source and to the second control circuit. In a first position of the second switch, the second light emitting diode is off and; in a second position of the second switch the second light emitting diode is illuminated. A ballast module of adjustable or fixed mass is connected to the second light module by a third length of the cord is provided for pulling downwardly the drop zone marker.

In another embodiment a drop zone marker is disclosed wherein the parachute includes as part of its canopy a closed-end tubular extension or packing/deployment bag attached at its open end at the apex of canopy so as to be part of the air-holding structure when the parachute is inflated, the closed end of such tubular extension has connected or sewn to it a handle or loop that can be grasped by a parachutist's free hand. The tubular extension of the parachute canopy or packing/deployment bag provides a closed-end cavity into which all of the components of the drop zone marker including ballast, light modules, lines, and main parachute canopy can be appropriately rigged, rolled, and packed in such a way as to provide for tangle-free deployment of the drop zone marker and its connected components by the parachutist during descent to the drop zone. In this embodiment, the drop zone marker is deployed by the parachutist by holding the device by the handle integrated into the closed end of the tubular extension and then by shaking or snapping the device toward the ground, allowing the connected contents of the device to spill out of the tubular extension or deployment bag, preferably in a non-tangled manner so as to extend to full length before the parachutist releases the handle and allows the device to descent to the ground. In a preferred embodiment, the open end of the tubular extension where it meets and becomes part of the resilient semi-closure which serves to contain the components of the drop zone marker in the packed condition and until ejected by the parachutist upon deployment of the device.

In another embodiment, the light modules have sufficient directional light emission as to ensure omni-directional illumination so that emitted light can be seen by the parachutist during descent to the drop zone and after the light modules have landed and come to rest.

In another embodiment, the light modules include more than one light emitting device; each juxtaposed in a manner that ensures that the emitted light can be seen by the parachutist during descent to the drop zone and after the light module has landed.

In another embodiment a small cord stuffing bag is attached to the cord or line separating the light modules at a point near one of light modules. This cord stuffing bag is sized so as to contain all of the line or cord between the two light modules stowed in a manner so as to ensure full and tangle-free extension of the line or cord between the light modules during deployment of the device of the parachutist.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
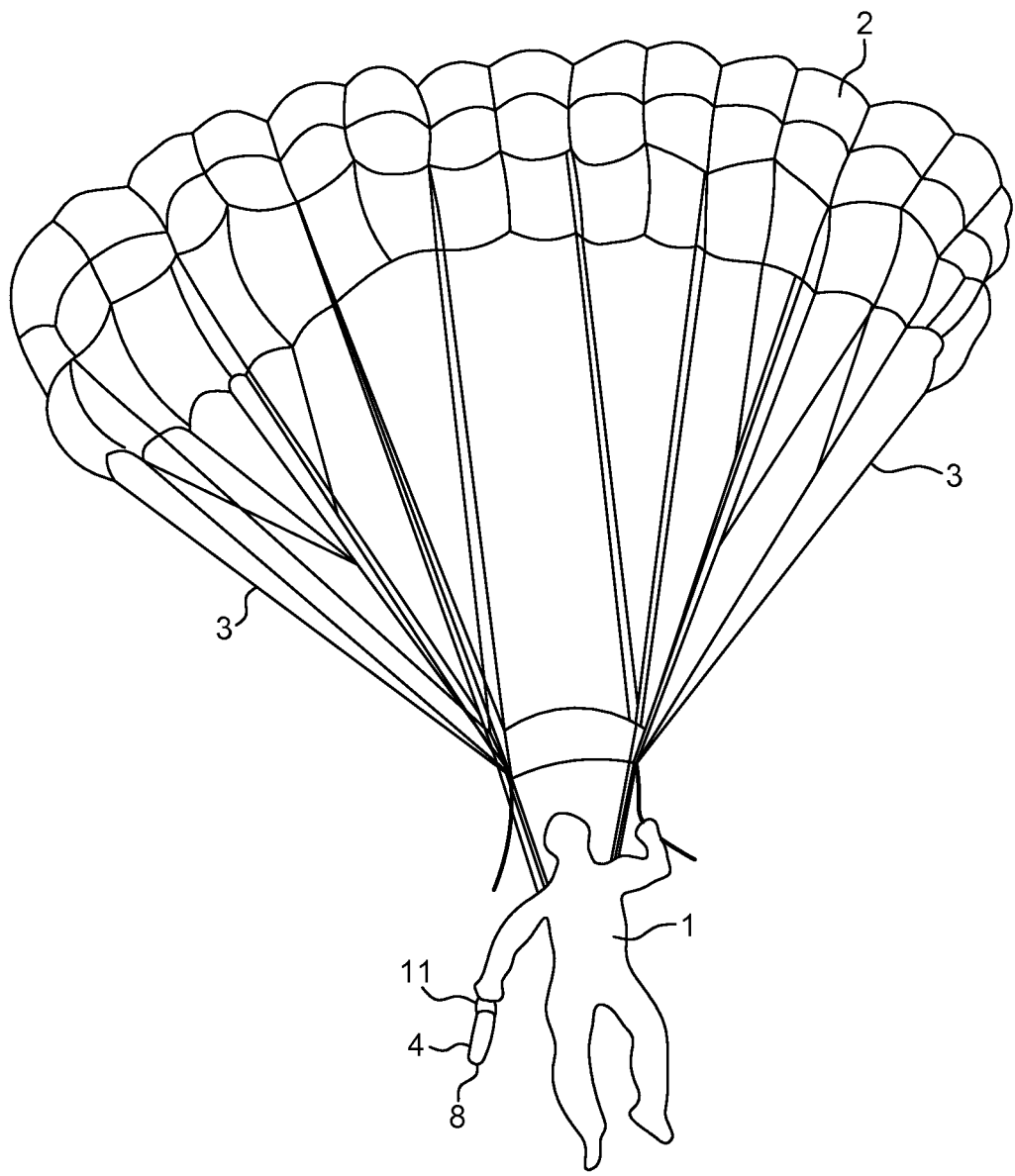
FIG. 1 illustrates a schematic view of a packaged drop zone marker held by a parachutist.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a parachutist 1 is shown descending (e.g., from an aircraft—not shown). The parachutist 1 is using a parachute 2/3. In one hand of the parachutist 1 is a drop zone marker 4 in a deployment bag 9, held by the handle 11 and open at one end through a sphincter-like opening 8 (see FIG. 8). At a point in which the parachutist 1 knows where the landing zone will be, the parachutist 1 deploys the drop zone marker 4 by, for example, by holding the handle 11 and shaking or snapping the drop zone marker deployment bag 9 until the drop zone marker 4 exits the deployment bag 9 (see FIG. 8). The deployment and landing of the drop zone marker 4 is described in FIGS. 2-7.

Referring to FIGS. 2-7, schematic views of a drop zone marker 4 are shown in various stages of deployment, descending, and landing. Other arrangements and configurations of the drop zone marker 4 are fully anticipated and the example shown in all of the figures is one possible configuration. For example, it is fully anticipated that in some configurations there are two or more parachutes 12 connected by any number of parachute cords 14. Likewise, in some configurations, there are more than two light modules 20/21 and/or more than one ballast module 40, all of which are included in the present invention.

In the example shown in FIGS. 2-7, there is a parachute 12 having parachute cords 14 attached as known in the industry. The parachute cords converge, either at a connecting cord 16 or directly connected to a first light module 20 (downwind light module). The first light module 20 is connected to a second light module 21 by a length of separation cord 18, for example thirty feet (30') of separation cord 18. It is preferred, though not required, that the separation cord 18 is stuffed into a cord stuffing bag 22 and, once the ballast 40 pulls the parachute 12 open, the separation cord 18 pulls out of the cord stuffing bag 22 and stretches out as shown in FIGS. 3-7.

The second light module 21 is connected to the ballast 40 by another length of cord 24. The ballast 40 includes one or more ballast elements connected to each other to provide an adjustable amount of ballast to adjust a rate of descent of the drop zone marker 4 (e.g., by adding or subtracting weight from the ballast 40). In some embodiments, the ballast elements are contained in a ballast module 40 such as egg-shaped sinkers made of a high-density material such as steel or lead. In some embodiments, one or more ballast elements are connected to each other in any way known in the industry including using ties, hooks, a line threaded through holes in the ballast elements, etc. The rate of descent of the drop zone marker 4 is adjustable by changing the number of ballast elements in the ballast module 40. In such, by adding more ballast elements, the drop zone marker 4 will descend at a greater rate of speed. Note that in some embodiments, a fixed mass ballast 40 is also anticipated without the ability to add or remove weight.

Figure 2:
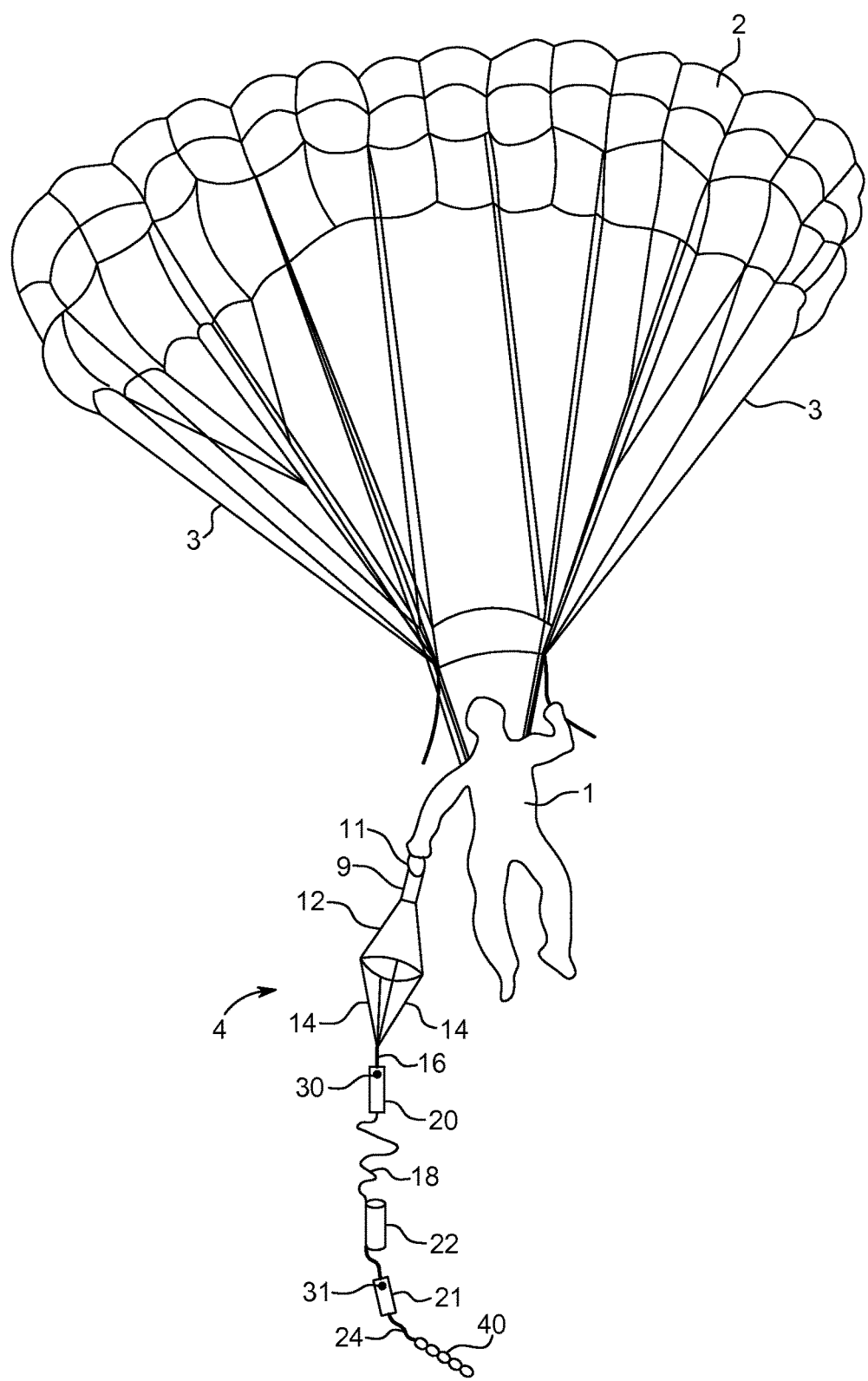
FIG. 2 illustrates a plan view of the drop zone marker held by a parachutist and deployed.
Figure 3:
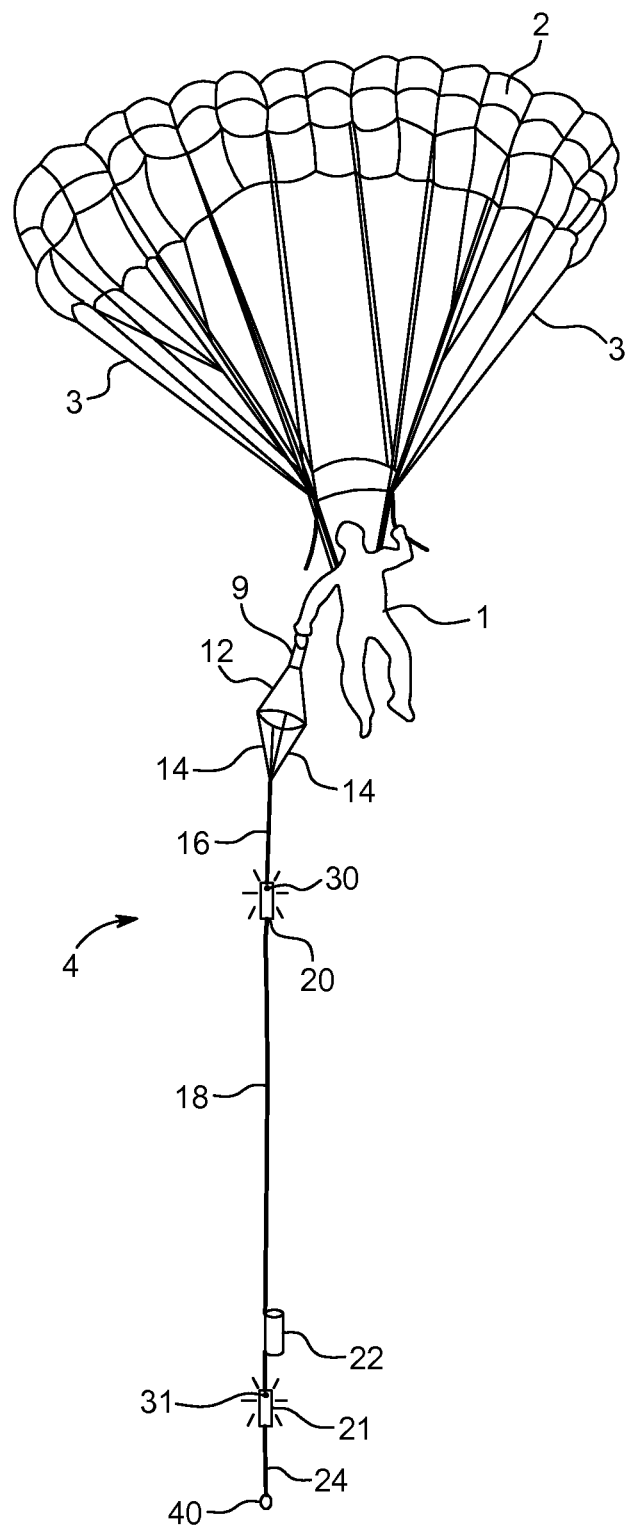
FIG. 3 illustrates a plan view of the drop zone marker held by a parachutist, deployed and illuminated.
Figure 4:
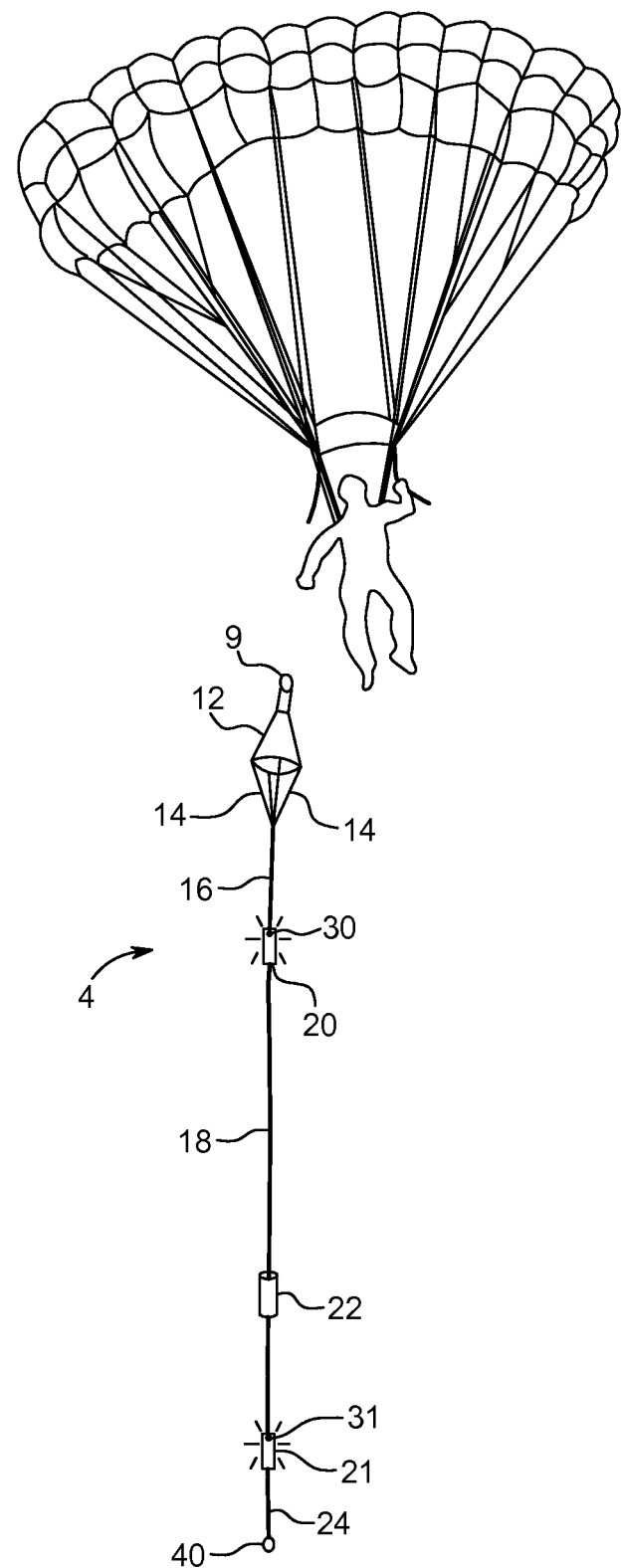
FIG. 4 illustrates a plan view of the drop zone marker as it descends before the ballast module reaches the drop zone target.
Figure 5:
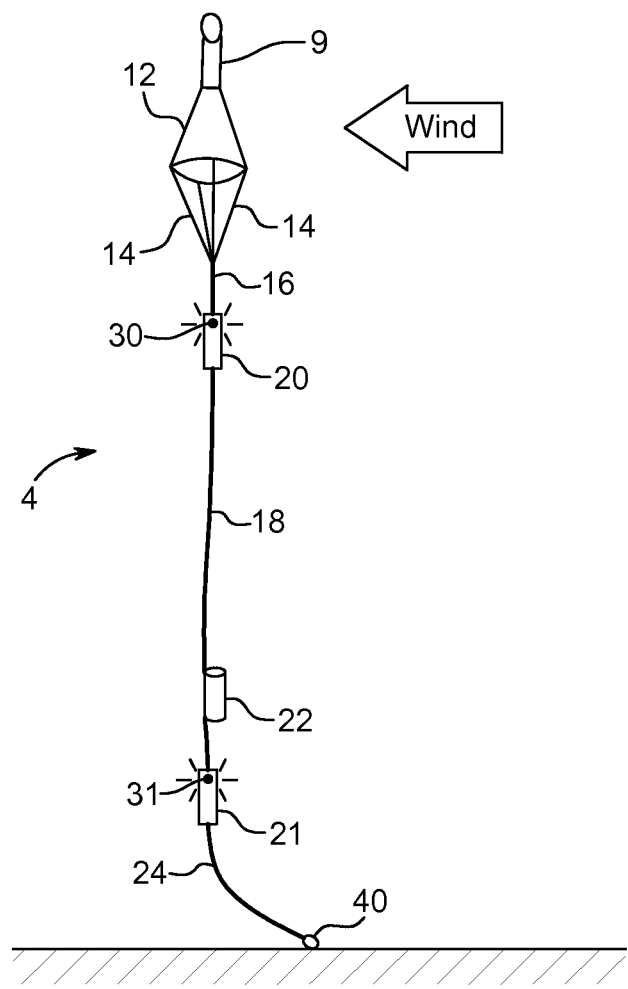
FIG. 5 illustrates a plan view of the drop zone marker as it descends at a point where the ballast module reaches the drop zone target.
Figure 6:
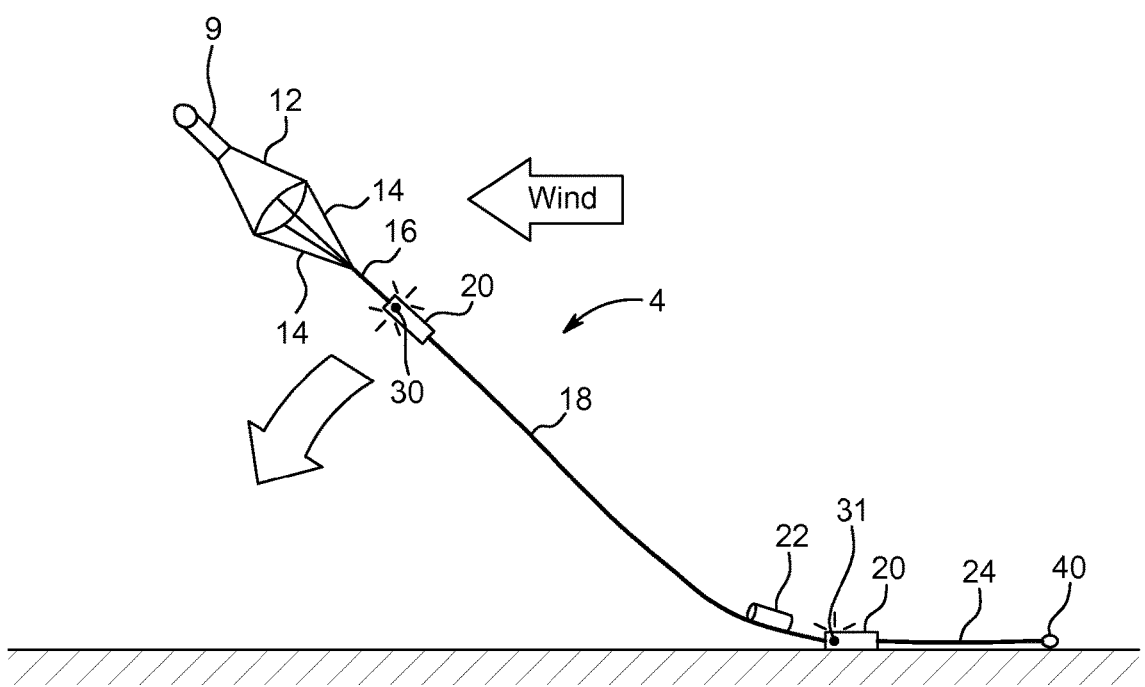
FIG. 6 illustrates a plan view of the drop zone marker after the ballast module reaches the drop zone target, showing the wind current pushing the parachute.
Figure 7:
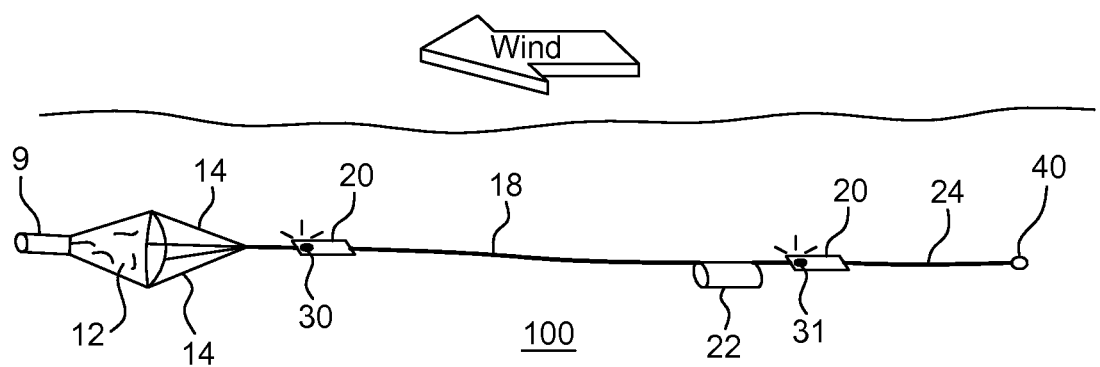
FIG. 7 illustrates a plan view of the drop zone marker after the parachute of the drop zone marker comes to rest on the ground.

Referring to FIGS. 2-7, plan views of the drop zone marker 4 are shown; in FIG. 2, the drop zone marker 4 is deployed, but the ballast module 40 has not yet activated the light modules 20/21 and therefore, the light modules 20/21 are not illuminated. In FIG. 3, the drop zone marker 4 is deployed, and the tension on the cords 16/18/24 between the ballast 40 and the parachute 12 engages switches 150 within the light modules 20/21; therefore, the light modules 20/21 are illuminated. In FIG. 4, the parachutist has released the drop zone marker 4 and it descends towards the ground 100 (see FIGS. 5-7). In FIG. 5, the ballast 40 reaches the drop zone target and comes to rest on the drop zone target. In FIG. 6, the descent rate of the parachute 12 of the drop zone marker 4 is slowed significantly by the grounding of the ballast 40 but continues to descend at a much slower rate having been relieved of the weight of the ballast 40. The parachute 12 is now carried in the direction of the surface winds. In FIG. 7, the drop zone marker 4 is at rest on the ground 100. As the parachutist 1 continues to descend, the approximate location of the intended drop zone is evident to by the illumination of the light modules 20/21. In a preferred embodiment, each of the light modules 20/21 emits a unique wavelength of light (e.g. one illumination modules emits red light and one illumination modules emits green light) or mode of light (e.g., steady light, blinking light, pattern of plinking, etc.). As an example, the upwind light module 21 emits as steady red light and the downwind light module 20 emits a green flashing light. By emitting different wavelengths of light or modes of light, the parachutist is able to discern which light module 20/21 is connected to the ballast 40 (downwind light module 21) and which light module 20/21 is closest to the parachute 12 (upwind light module 20) and, hence, downwind from the drop zone where the ballast module 40 has come to rest. The relationship between the light modules 20/21/21 provide information to the parachutist as to the direction of the wind (e.g., by relative position and color or mode) and the strength of the wind by the separation distance between the light modules 20/21. For example, in a very light wind, the light modules 20/21 will be very close to each other while in a strong wind, light modules 20/21 will be at the maximum distance from each other as dictated by the connecting cord 18.

In FIG. 2, the drop zone marker 4 has been deployed from the parachutist 1. In this, the ballast 40 has not achieved full vertical separation from the inflated parachute canopy 12 and there is insufficient tension on the cords 16/18/24 to cause activation of the switches 150 (see FIGS. 9, 10, 10A) and, therefore, the light modules 20/21 are not yet illuminated. Note that the luminaries 30/31 are not illuminated as the switches 150 have not been activated.

In FIG. 3, the parachute 12 has opened and the ballast 40 has pulled the separation cord 18 out of the cord stuffing bag 22 and the light modules 20/21 are separated by the full length of the separation cord 18. In this, the parachutist 1 is still holding the handle 11 of the drop zone marker 4, waiting to release the drop zone marker 4 over the proper drop area. At this point, the tension of the ballast 40 toggles the switch 150, resulting in illumination of the luminaries 30/31.

In FIG. 4, the parachutist 1 has released the drop zone marker 4 such that it will land at the target drop zone 100. The drop zone marker 4 descends at a relatively high rate of speed, determined by the size and shape (drag) of the parachute 12, and the mass of the ballast 40.

In FIG. 5, the first part of the drop zone marker 4 that reaches the ground 100 is the module 40. Once the module 40 reaches the ground, the ballast 40 anchor and remains relatively stationary while the parachute 12 continues to descend, now at a slower rate of descent since the parachute 12 is no longer descending at high rate of speed having been relieved of the weight of the ballast 40.

In FIG. 6, the ballast 40 remains substantially in place while the surface winds carry the parachute end (the end at which the parachute 12 is located) downwind. Note that there is some separation between the light modules 20/21, though it is anticipated that in circumstances of absolutely no wind, the parachute 12 will land substantially at the same location as did the ballast 40.

In FIG. 7, the parachute 12 and downwind light module 20 have landed and rest downwind from the ballast 40 and the upwind light module 21 as the surface winds have carried the parachute 12. Therefore, the direction of the upwind light module 21 with respect to the downwind light module 20 is an indication to the parachutists as to which way the surface wind is blowing. Further, the distance between the upwind light module 21 and the downwind light module 20 is indicative of the strength of the winds at the ground 100. For example, if the ground winds are over a certain threshold, the parachute 12 is pulled as far away from the ballast 40 as possible, restricted only by the separation cord 18. In contrast, if there are very slight winds, then the parachute 12 will land relatively close to the ballast 40 with minimal separation between the light modules 20/21.

As the parachutists approach the drop zone 100, the parachutists will be able to differentiate the downwind light module 20 from the upwind light module 21 by, for example, color, intensity, flashing or steady, rate of flashing, etc. In some embodiments, the upwind light modules 21 emits infrared light that is typically invisible to the naked eye of a human, but is visible to a parachutist 1 wearing night vision goggles. In such, being that color will not differentiate the light modules 20/21, a mode is incorporated to differentiate the light modules 20/21, for example, the downwind light module 20 blinks and the upwind light module 21 is steady.

In some embodiments, each of the light modules 20/21 include a switch 150 (see FIGS. 9/10/10A) that, in one position saves power and reduces visibility of the parachutist 1 by not emitting light through the luminaries 30/31; and in a second position, the light modules 20/21 initiates emission of light. After the drop zone marker is deployed, tension between the ballast 40 and the parachute 12 moves the switches 150 from the open position to the closed position, thereby illuminating the light modules 20/21. In such embodiments, the switches 150 are coupled to the cords 16/18/24 such that the switches 150 are initially configured the off position (no flow of current), then upon deployment of the parachute 12, the mass of the ballast 40 acting against the drag of the inflated parachute 12 exerts force onto the cords 16/18/24 and, this force toggles the switches 150, activating and illuminating the luminaries 30/31.

Figure 8:
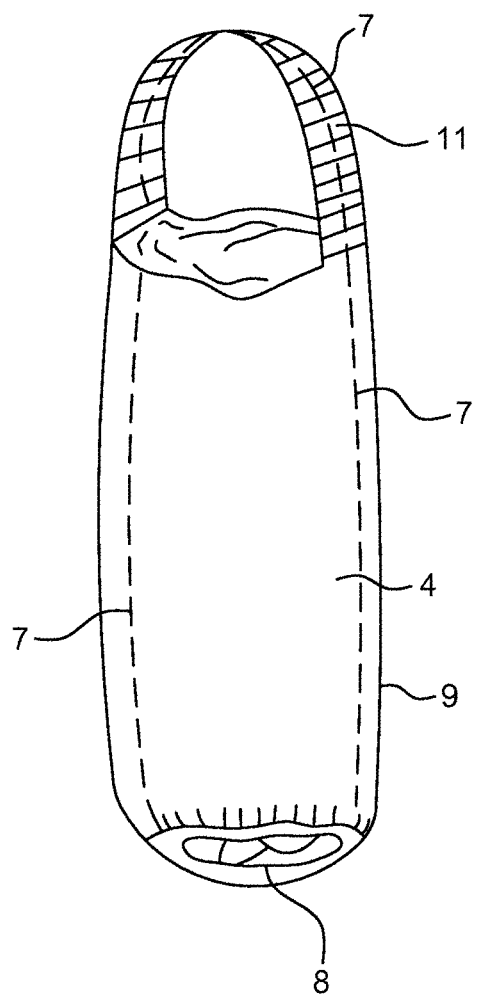
FIG. 8 illustrates a perspective view of the drop zone marker in a carrying case (before deployment).

Referring to FIG. 8, the drop zone marker 4 is shown packed and secured within the packing/deployment bag 9. The packing/deployment bag is a tubular extension of the parachute 12, the open end of which is integral and situated at the apex of the canopy of the parachute 12. The permanently closed-end of the tubular extension of the parachute 12 is fitted with a handle 11 The handle 11 is attached to the closed end of the packing/deployment bag portion 9 in a manner that addresses the sometimes high forces that will be transmitted to that attachment during an in-flight deployment of the drop zone marker 4. The handle 11 is sized and configured for retrieval of the drop zone marker 4 from its temporary storage area on the parachute rig or jump suit of the parachutist 1 with a single-hand, (b) secure retention of the handle 11 during a one-handed, high force deployment sequence, and (c) easy release of the handle once full deployment of the device has been confirmed and the device is ready to be released over the intended drop zone. The handle 11 and the packing/deployment bag 9 are anticipated to be strengthened against high deployment forces by the incorporation of reinforcement line 7 which is an extension of the load-bearing parachute lines 14. The open-end of the packing/deployment bag portion of the parachute 12 preferably includes a captured, integral expandable/contractible resilient (e.g., elastic material there within) closure 8 (sphincter-like) which serves to contain the components of the drop zone marker in the packed condition and until ejected by the parachutist upon deployment of the device.

Figure 9:
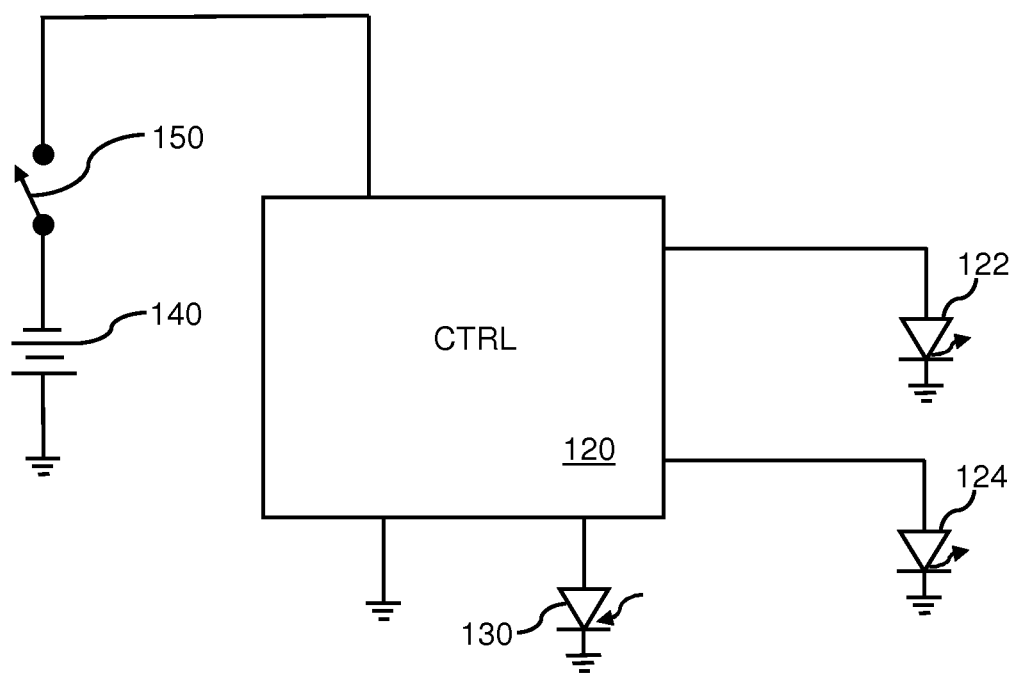
FIG. 9 illustrates an exemplary schematic circuit of the drop zone marker light modules.

Referring to FIG. 9, an exemplary schematic circuit of one of the light modules 20/21 is shown. Each of the light modules 20/21 includes a power source 140 such as a battery, though any power source 140 is anticipated. The power source 140 provides power to a circuit through the switch 150. The switch 150 is typically left in an open position when the drop zone marker 4 is not in use and moves to a closed position when the drop zone marker 4 is deployed, for example, by a parachutist 1. When the switch 150 is closed, power is provided to a control circuit 120. In some embodiments, the control circuit 120 is simply a current limiter or a source of constant current to one or more luminaries 30/31 such as light emitting diodes 122/124, providing a relatively constant light output from the light emitting diodes 122/124 when the switch 150 is closed. In some embodiments, the control circuit 120 provides for selection of which light emitting diodes 122/124 are illuminated, at what brightness, and at what color, as mufti-colored light emitting diodes 122/124 are fully anticipated. Further, in some embodiments, the control circuit 120 provides for mode control such as blinking (flashing) of one or more of the light emitting diodes 122/124. Therefore, it is fully anticipated that in various embodiments, the light modules 20/21 emit light (when the switch 150 is closed) in a single color, in multiple colors, blinking, one color solid and one color blinking, alternating between colors, alternating between brightness, etc. It is also fully anticipated that one or all of the light emitting diodes 122/124 emits light in the infrared range or other wavelength that is generally not visible to the naked eye of a human. Although light emitting diodes 122/124 are shown in the light modules 20/21 for brevity and clarity purposes, any luminary 30/31 (light-emitting device) is anticipated such as incandescent lamps, fluorescent lamps, etc.

In some embodiments, each of the light modules 20/21 is manufactured to emit a fixed light or pattern when the switch 150 is closed. For example a first light module 20 emits a green light and a second light module 21 emits a red light, etc. In an alternate embodiment, each light module 20/21 is configurable to emit light of a certain color, flashing, etc. It is anticipated that the configuration is changed through any means known, including a configuration switch (not shown), factory settings (e.g. circuit board paths open/closed jumpers, switches, etc.), or, in some embodiments, the control circuit 120 has a small amount of non-volatile memory and the ability to change configurations through the controller 120. In such, the controller 120 receives configuration instructions, for example, through an optional photo detector such as a photo diode 130. In such, each light module 20/21 is programmed to the desired configuration by a series of light pulses received by the photo detector 130 and interpreted by the controller 120.

Figure 10:
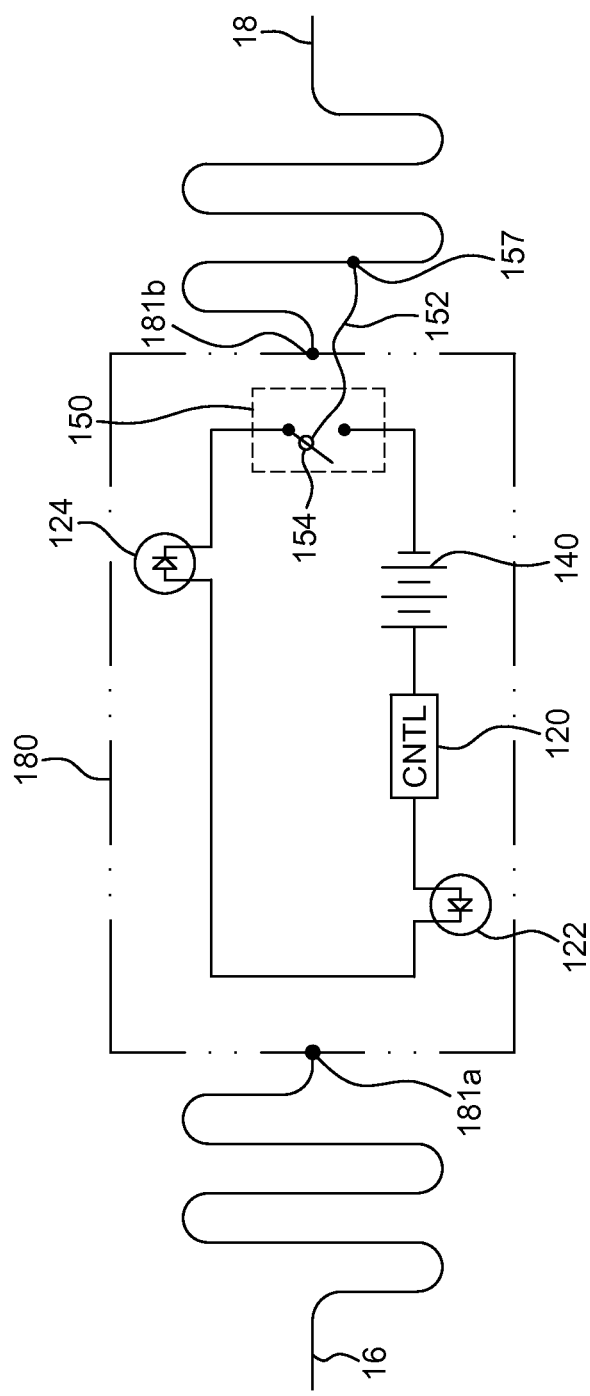
FIG. 10 illustrates an exemplary view of an embodiment of the drop zone marker light module.

Referring to FIG. 10, an exemplary cut-away view of one of the light modules 20/21 is shown. Note that the light modules 20/21 are similar to each other except for the wavelength and/or mode of light emitted. This example shows the light module 20/21 is assembled upon and/or within a carrier 180. An interconnecting cord 16 is attached at one end of the carrier 180 at a first attach point 181a. The interconnecting cord 18 is attached at the second end of the carrier at a second attach point 181b. An actuating cord 152 terminating in a switch actuator 154 is attached to the interconnecting cord 18 at the cord attach point 157. The switch 150 is held in position on/in the carrier 180 along with the switch actuator 154 that is coupled to the actuating cord 152. In FIG. 10, the switch 150 is shown in the open position (no current flowing). When the marker system 4 is deployed, force from the ballast 40 pulling through the interconnecting cords 16/18/24 is exerted between, for example, the cords 16/18, thereby exerting a pulling force between the carrier 180 and the actuating cord 152, thereby pulling the switch 150 into the closed position and, henceforth, closing the circuit between the battery 140 and the control circuit 120 resulting in illuminating one or more of the light emitting diodes 122/124 as described above. Again, this is but an example of one such automated initiating system and many others are equally anticipated performing the same or similar function is other ways.

Figure 10A:
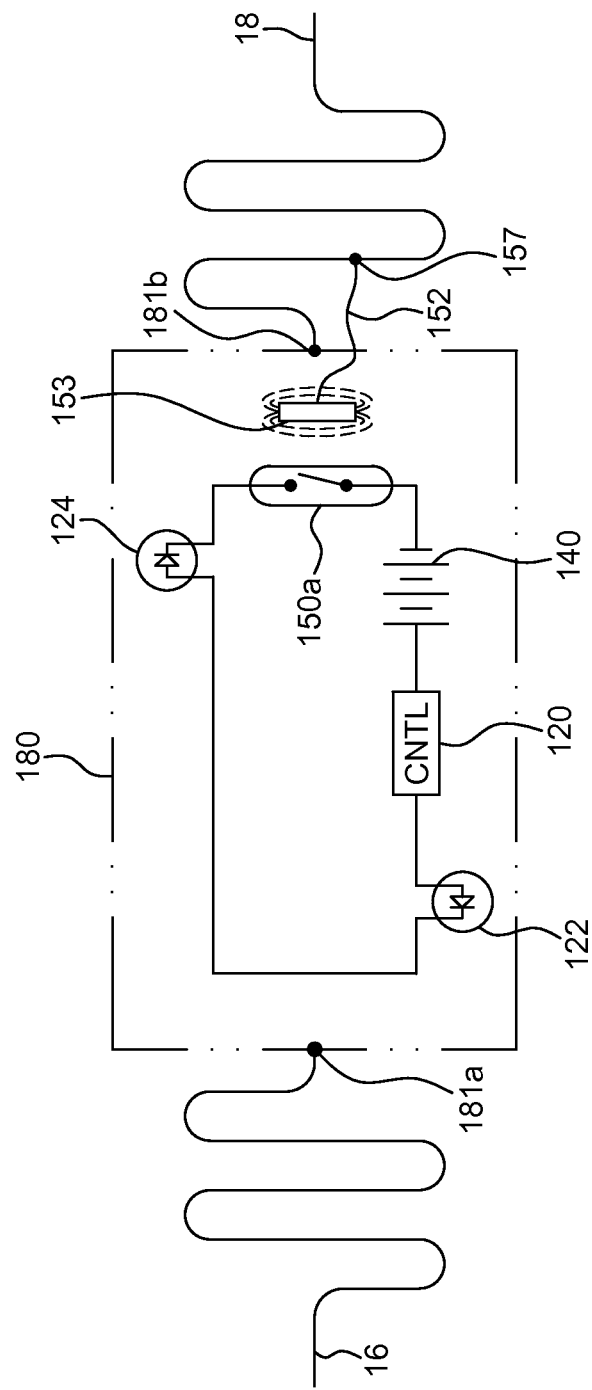
FIG. 10a illustrates a second exemplary view of an embodiment of the drop zone marker light module.

In the embodiment of FIG. 10a, the switch 150 is a magnetic reed switch 150A used in conjunction with a magnet 153 which is attached to the free end of the actuating cord 152, such that, when the marker system 4 is deployed, force from the ballast 40 pulling through the interconnecting cords 16/18/24 is exerted through the interconnecting cord 18, thereby exerting a pulling force between the carrier 180 and the magnet 153 moving the magnet 153 away from the magnetic reed switch 150A, thereby closing the switch 150A and, henceforth, closing the circuit between the battery 140 and the control circuit 120 resulting in illumination of one or more of the light emitting diodes 122/124.

Again, although the marker system 4 is shown with light emitting diodes 122/124, any luminary 30/31 (illumination device) is anticipated. Also, any power source 140 is equally anticipated.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A drop zone marker comprising:
   a parachute;
   a first light module, the first light module interfaced to the parachute;
   a second light module, the second light module connected to the first light module and the parachute by a separation cord; and
   ballast, the ballast connected to the second light module.

2. The drop zone marker of claim 1, wherein each of the first light module and the second light module comprise a carrier, a source of power, and a light emitting diode.

3. The drop zone marker of claim 2, wherein the light emitting diode in the first light module emits light of a first wavelength and the light emitting diode in the second light module emits light of a second wavelength, the second wavelength different from the first wavelength.

4. The drop zone marker of claim 2, wherein the light emitting diode in the first light module emits light of a first wavelength blinking at a first blinking rate and the light emitting diode in the second light module emits light of the first wavelength, blinking at a second blinking rate, the second blinking rate being different from the first blinking rate.

5. The drop zone marker of claim 4, wherein the first wavelength of light and the second wavelength of light are not visible to the naked eye of a human.

6. The drop zone marker of claim 2, wherein each of the first light module and the second light module further comprise a switch, the switch providing power from the power source to illuminate the light emitting diode when the switch is closed and the switch opening a circuit from the power source to the light emitting diode when the switch is opened.

7. The drop zone marker of claim 6, wherein the switch of each of the light modules is interfaced between the parachute and the ballast such that, when the parachute opens and the ballast applies downward force on the drop zone marker, the downward force is interfaced to the switch of each light module resulting in the switch of each light module moving into the closed position, thereby illuminating the light emitting diode of each light module.

8. The drop zone marker of claim 1, further comprising a cord stuffing bag, the cord stuffing bag having a handle at one end forming an upper end of the parachute and a sphincter-like opening at a distal second end such that the parachute, first light module, second light module, and separation cord are contained in the cord stuffing bag until a jerking-motion is applied to the handle.

9. A drop zone marker comprising:
a parachute;
a first light module, the first light module connected to the parachute by a first length of cord;
a second light module, the second light module connected to the first light module by a second length of the cord; and
ballast, the ballast connected to the second light module by a third length of the cord.

10. The drop zone marker of claim 9, wherein each of the first light module and the second light module comprise an enclosure containing a source of power and a light emitting diode.

11. The drop zone marker of claim 10, wherein the light emitting diode in the first light module emits light of a first wavelength and the light emitting diode in the second light module emits light of a second wavelength, different from the first wavelength.

12. The drop zone marker of claim 10, wherein the light emitting diode in the first light module emits light of a wavelength blinking at a first blinking rate and the light emitting diode in the second light module emits a steady light of the wavelength.

13. The drop zone marker of claim 11, wherein the wavelength of light is not visible to the naked eye of a human.

14. The drop zone marker of claim 10, wherein each of the first light module and the second light module further comprise a switch, the switch providing power from the power source to illuminate the light emitting diode when the switch is closed and the switch opening a circuit from the power source to the light emitting diode when the switch is opened.

15. The drop zone marker of claim 13, wherein the switch of the first light module is interfaced between the first cord and the second cord, and the switch of the second light module is interfaced between the second cord and the third cord such that, when the parachute opens and the ballast applies downward force on the drop zone marker, the downward force is interfaced to the switch of each light module resulting in the switch of each light module is closed, thereby illuminating the light emitting diode of each the first light module and the second light module.

16. The drop zone marker of claim 15, wherein the wherein the second length of cord is nominally 30 to 60 feet in length.

17. A drop zone marker comprising:
a parachute;
a first light module comprising a first light emitting diode, a first power source, a first control circuit, and a first switch; the first control circuit operatively coupled to the first light emitting diode and the first power source; the first switch operatively coupled to the first power source and to the first control circuit such that in a first position of the first switch, the first light emitting diode is off and in a second position of the first switch, the first light emitting diode is illuminated, the first light module connected to the parachute by a first length of cord;
a second light module comprising a second light emitting diode, a second power source, a second control circuit, and a second switch, The second control circuit operatively coupled to the second light emitting diode, the second power source, and the second switch, the second switch coupled to the second power source and to the second control circuit such that in a first position of the second switch, the second light emitting diode is off and in a second position of the second switch the second light emitting diode is illuminated, the second light module connected to the first light module by a second length of the cord;
a ballast, the ballast connected to the second light module by a third length of the cord;
a cord stuffing bag, a first end of the cord stuffing bag having a handle, the cord stuffing bag interfaced to the parachute, and the parachute, first light module, second light module, first length of cord, second length of cord, third length of cord, and ballast contained within the cord stuffing bag until deployed.

18. The drop zone marker of claim 17, wherein the first light emitting diode emits light of a first wavelength and the second light emitting diode emits light of a second wavelength, different from the first wavelength.

19. The drop zone marker of claim 17, wherein the first light emitting diode and the second light emitting diode emit light of a common wavelength, the first light emitting diode emits light in a first mode and the second light emitting diode emits light in a second mode, the first mode being different from the second mode.

20. The drop zone marker of claim 17, wherein the first switch is interfaced between the first cord and the second cord, and the second switch is interfaced between the second cord and the third cord such that, when the parachute opens and the ballast applies downward force on the drop zone marker, the downward force is interfaced to the first switch and the second switch, resulting in the first switch activating the first circuit, thereby illuminating the first light emitting diode and the second switch activating the second circuit, thereby illuminating the first second emitting diode.

* * * * *